(12) United States Patent
Milden et al.

(10) Patent No.: US 12,443,906 B1
(45) Date of Patent: Oct. 14, 2025

(54) SYSTEMS AND METHODS FOR ENHANCED RISK IDENTIFICATION BASED ON TEXTUAL ANALYSIS (71) Applicant: Fannie Mae, Washington, DC (US)

(72) Inventors: Robert Milden, Washington, DC (US); Terri Kennell, Washington, DC (US)

(73) Assignee: Fannie Mae

( * ) Notice: Subject to any disclaimer, the term of this patent is extended or adjusted under 35 U.S.C. 154(b) by 0 days.

(21) Appl. No.: 18/144,488

(22) Filed: May 8, 2023

Related U.S. Application Data (63) Continuation of application No. 17/184,092, filed on Feb. 24, 2021, now Pat. No. 11,681,966.

(51) Int. Cl.
   *G06Q 10/0635* (2023.01)
   *G06F 40/247* (2020.01)
   *G06F 40/40* (2020.01)

(52) U.S. Cl.
   CPC ....... *G06Q 10/0635* (2013.01); *G06F 40/247* (2020.01); *G06F 40/40* (2020.01)

(58) Field of Classification Search
   CPC ..................... G06Q 10/0635; G06Q 10/063
   See application file for complete search history.

(56) References Cited

U.S. PATENT DOCUMENTS

| | | | |
|---|---|---|---|
| 7,747,520 B2 | 6/2010 | Livermore et al. |
| 8,065,234 B2 | 11/2011 | Liao et al. |
| 8,121,920 B2 | 2/2012 | Liao et al. |
| 8,489,499 B2 | 7/2013 | Yan et al. |
| 8,606,615 B2 | 12/2013 | Milden et al. |
| 8,612,320 B2 | 12/2013 | Walker et al. |
| 8,639,618 B2 | 1/2014 | Yan et al. |
| 8,655,595 B1 | 2/2014 | Green et al. |
| 8,769,671 B2 | 7/2014 | Shraim et al. |
| 9,031,881 B2 | 5/2015 | Graboske |
| 9,032,531 B1 | 5/2015 | Scorvo et al. |
| 9,213,994 B2 | 12/2015 | Green et al. |
| 9,406,032 B2 | 8/2016 | Salonen |
| 9,466,059 B2 | 10/2016 | Choudhuri et al. |

(Continued)

OTHER PUBLICATIONS

Conway, Mike, et al. "Moonstone: a novel natural language processing system for inferring social risk from clinical narratives." Journal of biomedical semantics 10 (2019): 1-10. (Year: 2019).*

(Continued)

*Primary Examiner* — William S Brockington, III
(74) *Attorney, Agent, or Firm* — Foley & Lardner LLP (57) ABSTRACT

A computer system includes circuitry for executing operations, including receiving an input text file comprising metadata, receiving risk enrichment data, and generating an affinitized data set based on the input text file and the risk enrichment data. Generating the affinitized data set includes the operations of determining a context-indicative keyword, determining a synonym of the context-indicative keyword, searching the input text file for the context-indicative keyword or the synonym, identifying the context-indicative keyword or the synonym in the input text file, and generating the affinitized data set, the affinitized data set comprising a risk descriptor determined based on the at least one of the plurality of context-indicative keywords and the metadata.

20 Claims, 4 Drawing Sheets

(56) References Cited

U.S. PATENT DOCUMENTS

| | | | |
|---|---|---|---|
| 9,904,955 B2 | 2/2018 | Watters et al. | |
| 9,965,628 B2 | 5/2018 | Ford et al. | |
| 9,990,678 B1 | 6/2018 | Cabrera et al. | |
| 10,210,470 B2 | 2/2019 | Datta Ray | |
| 10,360,525 B1 | 7/2019 | Milden et al. | |
| 2005/0108025 A1 | 5/2005 | Cagan | |
| 2006/0224499 A1 | 10/2006 | Graboske et al. | |
| 2011/0093792 A1* | 4/2011 | Frayman | G06Q 50/18 715/752 |
| 2012/0242488 A1* | 9/2012 | Wilson | G08B 21/10 340/601 |
| 2012/0259550 A1 | 10/2012 | Du | |
| 2012/0296692 A1 | 11/2012 | O'Malley et al. | |
| 2014/0025548 A1 | 1/2014 | Serio | |
| 2015/0032598 A1 | 1/2015 | Fleming et al. | |
| 2015/0066738 A1 | 3/2015 | Tian et al. | |
| 2016/0035051 A1 | 2/2016 | Graboske | |
| 2016/0055595 A1 | 2/2016 | Green et al. | |
| 2017/0053329 A1 | 2/2017 | Bowers | |
| 2017/0180404 A1* | 6/2017 | Bersch | H04L 63/1433 |
| 2017/0214701 A1 | 7/2017 | Hasan | |
| 2019/0050953 A1 | 2/2019 | Graboske | |
| 2019/0130404 A1 | 5/2019 | Merz et al. | |
| 2019/0238547 A1 | 8/2019 | Milden et al. | |
| 2019/0279228 A1 | 9/2019 | Ekambaram et al. | |
| 2020/0104369 A1* | 4/2020 | Bellegarda | G06F 40/30 |
| 2021/0224824 A1* | 7/2021 | Bowers | G06F 40/131 |

OTHER PUBLICATIONS

Conway, M., Keyhani, S., Christensen, L., South, B. R., Vali, M., Walter, L. C. Chapman, W.W. (2019). Moonstone: A novel natural language processing system for inferring social risk from clinical narratives. Journal of Biomedical Semantics, 10:6. (Year: 2019).

\* cited by examiner

SYSTEMS AND METHODS FOR ENHANCED RISK IDENTIFICATION BASED ON TEXTUAL ANALYSIS

CROSS-REFERENCE TO RELATED APPLICATION

This application is a continuation of U.S. patent application Ser. No. 17/184,092, filed Feb. 24, 2021, which is incorporated herein by reference in its entirety.

TECHNICAL FIELD

The present disclosure relates generally to systems and methods for textual analysis-based enhanced risk identification in financial computing systems. In particular, the present disclosure relates to systems and methods for affinitizing electronic text gathered from various sources and transmitting an alert to a responsible party, the alert including the affinitized electronic text.

BACKGROUND

Operational risk is defined by the Risk Management Association as a risk of loss resulting from inadequate or failed internal processes, people, and systems. Operational risk can also include the risk of loss from external events. Operational risk can expose organizations and individuals to liabilities, litigation, and various other undesirable outcomes. Some examples of operational risk include mortgage fraud, cybersecurity vulnerability, client products and business practices, money laundering, financial crime, vendor and outsourcing fraud, technology risk, and compliance and legal risk.

Identifying new risks and issues along with managing known issues are the primary functions of risk management. Risk management organizations are charged with ensuring that appropriate countermeasures, ones that decrease the likelihood or impact of a risk occurrence, are instituted and that issues are appropriately remediated. Decreasing the mean time to identification and resolution of risks and issues is generally the goal. Ideally, risks and issues should be identified prior to company and/or customer impact.

Governance, Risk and Compliance (GRC) platforms, also known as Integrated Risk Management (IRM), are evolving to progress towards this goal by bringing together and aligning what were once disparate data sets. Through the standardization of taxonomies, the integration of risk assessments and the availability of external industry and internal organizational information, activities which were once time-based (i.e., annual, quarterly, etc.) are beginning to be driven within GRC platforms by events such as the change in a process, an introduction of a new product or a new corporate structure. However, identification and remediation processes for these event-driven activities are usually driven by single data sources and remain largely manual in nature.

SUMMARY

One set of embodiments disclosed herein relates to a computing system for enhanced risk identification. The computing system includes a network interface structured to communicate data over a network, a database structured to retrievably store data related to a potential risk event, and a processing circuit comprising a processor and memory. The memory is structured to store instructions that are executable by the processor and cause the processing circuit to generate an input text file, receive risk enrichment data, and generate an affinitized data set based on the input text file and the risk enrichment data. Based on the affinitized data set, the data enrichment circuit generates metadata related to at least a subset of affinitized data. Based on the metadata, the data enrichment circuit identifies a responsible party. The early risk alert generation circuit then generates an early risk alert indicative of a potential risk event. The network interface transmits the early risk alert to the responsible party.

One set of embodiments relates to a computer-based method including receiving an input text file comprising metadata, receiving risk enrichment data, and generating an affinitized data set based on the input text file and the risk enrichment data. Generating the affinitized data set includes the operations of determining a context-indicative keyword, determining a synonym of the context-indicative keyword, searching the input text file for the context-indicative keyword or the synonym, identifying the context-indicative keyword or the synonym in the input text file, and generating the affinitized data set, where the affinitized data set includes a risk descriptor determined based on the at least one of the plurality of context-indicative keywords and the metadata. Based on the affinitized data set, the method includes generating metadata related to at least a subset of affinitized data, and based on the metadata, identifying a responsible party. The method further includes the operations of generating an early risk alert, the early risk alert indicative of a potential risk event, and transmitting the early risk alert to the responsible party.

It should be appreciated that all combinations of the foregoing concepts and additional concepts discussed in greater detail below (provided that such concepts are not mutually inconsistent) are contemplated as being part of the subject matter disclosed herein. In particular, all combinations of claimed subject matter appearing at the end of this disclosure are contemplated as being part of the subject matter disclosed herein.

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

These and other advantages and features of the invention, together with the organization and manner of operation thereof, will become apparent from the following detailed description when taken in conjunction with the accompanying drawings.

DETAILED DESCRIPTION

Referring to the Figures generally, systems and methods for enhanced risk identification based on textual analysis are illustrated. In operation, a computing system includes at least one circuit structured to receive a text file. The text file may be received from an external source computing system separate from a provider computing system, and/or may be generated by a circuit included in the provider computing system based on a input from the source computing system, such as a video file, an audio file, a data stream from a help desk product or an internal messaging board, etc.

The source computing system may be a mobile device, cell phone, tablet, laptop computer, desktop computer, processor, microprocessor, or similar system capable of transmitting a text file to the provider computing system. The provider computing system may be a system of servers, a computer network, a processor, a microprocessor, a desktop computer, a laptop computer, or the like. Herein, the use of "computer system" is referring to the provider computing system unless stated otherwise. The computing system may be configured to receive enrichment data. Enrichment data may include, for example, municipality data, such as building codes, average home values, demographic information, and the like. Enrichment data may further include internal loss data, external loss data, demographic data, economic data, and similar data. The computing system may use the enrichment data to generate an affinitized data set. The affinitized data set is a set of data that is formed by grouping similar data. The affinitized data may be expanded (e.g., added to) through an iterative process. For example, an affinitized data set may include at least one text file and at least some metadata (e.g., data that is not explicitly provided in the text file but is added to the text file by either of the source computing system or the provider computing system). In some embodiments, the provider computing system receives a first affinitized data set from the source computing system and affinitizes the first affinitized data set with a second affinitized data set maintained by the provider computing system. The first affinitized data set and the second data set may be affinitized based on the metadata, the content of text files, or a combination of sub-combination of both the metadata and the text files. In other words, the provider computing system may make a determination that the first affinitized data set is to be affinitized or combined with the second affinitized data set, the second affinitized data set growing larger by including the first affinitized data set. In some embodiments, a third affinitized data set is formed by affinitizing or combining the first affinitized data set with the second affinitized data set.

The affinitized data set may include a received text file and a portion of the enrichment data. The affinitized data set may then be assigned a risk score and sent to a responder computing system (e.g., a client device associated with a party that needs to be notified of the risk alert, as determined based on the affinitized data and/or metadata.) As defined herein, "responder computing system" denotes a computing system maintained and/or operated by a responder party. In some embodiments, the responder party is a bot or artificially intelligent machine. In some embodiments, the responder party is a person. After receiving the affinitized data set from the provider computing system, the responder party may make a determination based on one of the risk score and an analysis of the affinitized data set. The responder party may initiate an investigation in response to receiving the affinitized data set. In some embodiments, the responder party makes a request via the responder computing system to the provider computing system for more information, such as an additional affinitized data set. In some embodiments, the responder computing system is a node within the provider computing system. For example, the responder computing system may be a desktop computer operatively coupled to the provider computing system. In some embodiments, the responder computing system is a software application residing on the node (e.g., the desktop computer) or an external application residing separately from the node and, in some embodiments, separate from the provider computing system (e.g., a third-party responder computing system managed by the responder party). For example, the provider computing system may transmit an alert and/or the affinitized data set to a third-party computing system dissociated from (e.g., not operatively coupled to) the provider computing system (e.g., law firm, a government/regulatory body, a law enforcement agency, private investigator, etc.).

The technological processes carried out by the systems of the present disclosure provide technical benefits, thereby improving computing systems in the field. For example, operational risk can be predominantly focused on detection of fraud and suspicious transactions (e.g., funds transfer transactions, property transfer transactions, etc.). The computer systems of the present application are configured to analyze textual data to detect fraud, patterns of fraud, and other signs of operational risk. The computer system of the present disclose may detect isolated fraudulent transactions based on enriched textual data associated with the transaction, such as a description, location, name, and the like. Additionally, the systems and methods of the present disclosure are structured to assign a potentially fraudulent activity a risk score and then determine a responsible party to which to send the risk score and the affinitized data.

As utilized herein, the term "risk" refers to a risk of loss resulting from inadequate or failed internal and/or external events, processes, people, and/or systems. The terms "risk" and "operational risk" may be utilized interchangeably to refer to a risk or risk event. As utilized herein, "internal operational risk" refers to a risk of loss resulting from inadequate or failed internal events, processes, people, and/or systems.

Figure 1:
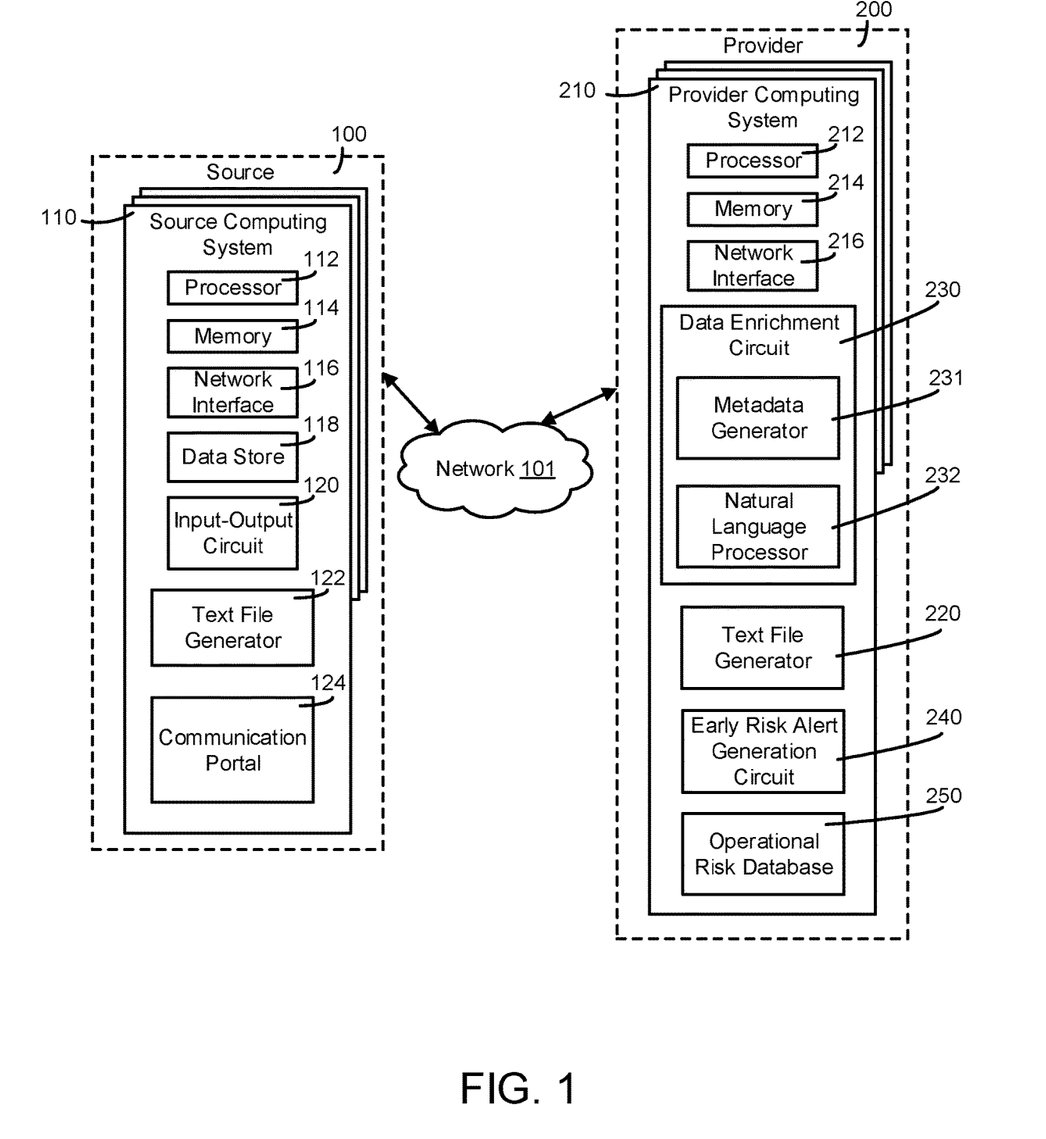
FIG. 1 is a block diagram of a source computing system and a provider computing system, the provider computing system comprising circuits structured to detect a risk event based on electronic text received from the source computing system, according to an example embodiment.

Referring to FIG. 1, a block diagram of a provider computing environment 50 for enhanced risk identification based on textual analysis is shown, according to an example embodiment. As used herein, the term "environment" denotes one or more computing systems, each computing system comprising at least one processor, memory, and at least one circuit. Each computing system may be communicatively coupled to other computing systems via a network.

In FIG. 1, a source computing system 110 is shown. The source computing system 110 includes a processor 112, a memory 114, a data store 118, an input/output circuit 120, a text file generator 122, and a communication portal 124. A provider computing system 210 is also shown, including a processor 212, a memory 214, a network interface 216, a text file generator 220, an data enrichment circuit 230, an early risk alert generation circuit 240, and a risk database 250 (e.g., operational risk database, internal operational risk database, etc.). In some embodiments, the data enrichment circuit 230 includes a natural language processor 232. The provider computing system 210 receives data, affinitizes data, determines recipients and routes alerts. For example, the provider computing system 210 may perform some or all of these operations based on data related to testing results, corporate assets, closed corporate issues, cross-line business issues, audit and regulatory findings, internal and external loss data, internal and external social media, alert systems, customer service channels, internal and external investigations, case management, human resources, risk assessments, and information security threat detection. The data may be received from the source computing system 110.

The provider computing system 210 and the source computing system 110 of FIG. 1 are communicatively coupled to one another and to other computing systems, such as responder computing systems and/or devices (not shown), via network 101. In one example arrangement, the network 101 includes the Internet. In other arrangements or combinations, the network 101 can include a local area network and/or a wide area network. The operation of the network 101 is facilitated by short and/or long-range communication technologies, such as Bluetooth® transceivers, Bluetooth® beacons, RFID transceivers, NFC transceivers, Wi-Fi transceivers, cellular transceivers, microwave transmitters, software radio, wired network connections (e.g., Ethernet), etc. The network 101 may be a packet-switched network, wherein one or more systems shown in FIG. 1 may exchange data using one or more communication protocols, such as a TCP, UDP, SCTP, ICPMv4, ICMPv6, etc. Various components of the environments of FIG. 1 include network (communications) interfaces, such as the network interfaces 116 and 216. The communications interfaces may include various circuitry programmed to communicate via the network 101, such as transceivers, interface engines, etc.

In some implementations, the source computing system 110 and/or the provider computing system 210 may be or include end-user devices and may comprise any of desktop computers, laptop computers, tablet computers, smart phones, e-readers, set top boxes, game systems, smartwatches, and the like. In some implementations, the source computing system 110 and the provider computing system 210 may be or include host devices, such as an application server, a database server, a mail server, etc. In some implementations, the source computing system 110 and the provider computing system 210 may or include be networking devices, such as routers, switches, etc. Although shown in the embodiment of FIG. 1 as singular, stand-alone devices, one of ordinary skill in the art will appreciate that, in some embodiments, the source computing system 110 and the provider computing system 210 may comprise virtualized systems and/or system resources. For example, in some embodiments, the source computing system 110 and the provider computing system 210 may be a virtual switch, virtual router, virtual host, virtual server, etc. In some embodiments, the source computing system 110 and the provider computing system 210 may share physical storage, hardware, and other resources with other virtual machines. In some embodiments, virtual resources of the network 101 may include cloud computing resources such that a virtual resource may rely on distributed processing across more than one physical processor, distributed memory, etc. In some embodiments, the source computing system 110 is a node within the provider computing system 210. As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon, etc.)

The source computing system 110 is shown to include the processor 112, the memory 114, and the network interface 116. The memory 114 may store machine-executable instructions that, when executed by the processor 112, cause the processor 112 to perform one or more of computer operations. The processor 112 may include one or more microprocessors, application specific integrated circuits (ASICs), field programmable gate arrays (FPGAs), other forms of processing circuits, or combinations thereof. The memory 114 may include, but is not limited to, electronic, optical, magnetic, or any other storage or transmission device capable of providing the processor 112 with program instructions. The memory 114 may include storage devices such as a floppy disk, CD-ROM, DVD, magnetic disk, memory chip, ROM, RAM, EEPROM, EPROM, flash memory, optical media, or any other suitable memory from which the processor 112 can read instructions and/or data. At least the processor 112 and the memory 114 may form a processing module. Further circuitry, such as the components and circuits described further herein, may be included in the processing module.

As shown according to an embodiment, the source computing system 110 includes the data store 118. The data store 118 is structured to retrievably store information received or generated by the source computing system 110. The provider computing system 210 may have access to the data store 118 via the network interface 216. The data store 118 may include non-transient data storage mediums (e.g., local disc or flash-based hard drives, local network servers) or remote data storage facilities (e.g., cloud servers). In embodiments where the source computing system 110 may be operated or managed by the operator of the provider computing system 210 (such that both systems are internal to a particular organizations) or by an external entity. The data store 118 may be structured and store various source data (text files, audio files, images, call log recordings or transcripts, help desk data, social media data, etc.) and/or various enrichment data formats, such as text files, audio files, images, scanned documents, paper files, handwritten notes, video files, news reports, documentaries, interviews, tax forms, social media data, and similar formats.

As shown, the source computing system 110 further includes the input/output circuit 120. The input/output circuit 120 is communicatively coupled to the processor 112, the memory 114, and the network interface 116. The input/output circuit 120 includes hardware and associated logics structured to enable the source 100 to exchange information with the source computing system 110. An input device or component of the input/output circuit 120 allows the source 100 to provide information to the source computing system 110, and may include, for example, a mechanical keyboard, a touchscreen, a microphone, a camera, a fingerprint scanner, any user input device engageable with the source computing system 110 via a USB, serial cable, Ethernet cable, and so on. An output device or component of the input/output circuit 120 allows the source 100 to receive information from the source computing system 110, and may include, for example, a digital display, a speaker, illuminating icons, LEDs, and so on.

The source computing system 110 further includes the text file generator 122. The text file generator 122 is communicatively coupled to the processor 112, the memory 114, and the network interface 116. In some embodiments, the text file generator 122 and the input/output circuit 120 may be structurally coupled, such that an input to the input/output circuit 120 may result in the creation of a text file by the text file generator 122. For example, the source 100 may interact with a keyboard (physical keyboard, touch screen keyboard) to type a message on a social media website. In some embodiments, the social media website is accessible only to the source computing system 110 and the provider computing system 210, such as an internal company message board or an internal company social media page. The text file generator 122 may generate structured data, unstructured data, and/or semi-structured data. The text file generator 122 may append metadata to the text file automatically upon generation of the text file without input from the source 100 to the input/output circuit 120. The metadata may include a device identifier, an IP address, geographical location, an identity of the author, a date, a time stamp, or similar information.

The source computing system 110 further includes the communication portal 124. The communication portal 124 may be an internal message board or social media site structured to be accessed via a node of the provider computing system 210. For example, the internal message board may be a software application persisting on the source computing system 110 and structured to be interacted with via the input/output circuit 120. In some embodiments, the communication portal 124 is a help desk system structured to respond to inputs to the communication portal 124, such as inputs from the input/output circuit 120. For example, the source 100 may type a message into the communication portal 124 and the communication portal 124 may respond to the typed inputs, such as with text, video, and audio. The communication portal 124 is communicatively coupled to the processor 112, the memory 114, and the network interface 116. The communication portal 124 is structured to receive notifications and alerts, such as an early risk alert, from the provider computing system 210. In some embodiments, the communication portal 124 is a software application installed on the source computing system 110 and structured to be accessible by the source 100. The source 100 may interface with a push notification displayed by the input/output circuit 120, causing the communication portal 124 to run (e.g., open, etc.) on the source computing system 110.

The provider computing system 210 is shown to include the processor 212, the memory 214, the network interface 216, and the text file generator 220. The memory 214 may store machine-executable instructions that, when executed by the processor 212, cause the processor 212 to perform one or more of computer operations. The processor 212 may include one or more microprocessors, application specific integrated circuits (ASICs), field programmable gate arrays (FPGAs), other forms of processing circuits, or combinations thereof. The memory 214 may include, but is not limited to, electronic, optical, magnetic, or any other storage or transmission device capable of providing the processor 212 with program instructions. The memory 214 may include storage devices such as a floppy disk, CD-ROM, DVD, magnetic disk, memory chip, ROM, RAM, EEPROM, EPROM, flash memory, optical media, or any other suitable memory from which the processor 212 can read instructions and/or data. The processor 212 and the memory 214 may form a processing module.

The provider computing system 210 further includes the text file generator 220. The text file generator 220 is communicatively coupled to the processor 212, the memory 214, and the network interface 216. In some embodiments, the text file generator 220 may be structurally coupled to an input/output circuit such that an input to the input/output circuit may result in the creation of a text file by the text file generator 220. For example, the provider 200 may interact with a keyboard (physical keyboard, touch screen keyboard) to type a message on a social media website. In some embodiments, the social media website is accessible only to the provider computing system 210, such as an internal company message board or an internal company social media page. The text file generator 220 may generate structured data, unstructured data, and/or semi-structured data. The text file generator 220 may append metadata to the text file automatically upon generation of the text file without input from the provider 200 to the input/output circuit. The metadata may include a device identifier, an IP address, geographical location, an identity of the author, a date, a time stamp, or similar information. In an example embodiment, the text file generator 220 may be structured to receive, via the network 101, an input (a single file, a batch of files, a .zip archive, an input stream via a REST interface or similar, etc.) comprising data from the data store 118. For example, the data can comprise audio data, such as an audio recording of a customer support call. The text file generator 220 may parse the audio recording into discrete components ("chunks") and transcribe it to a text-readable form by transcribing each chunk, determining the sequence of the chunks in the audio recording, and assembling a text document comprising the transcribed chunks according to the determined sequence. To increase processing speed, these operations may be performed in a cache (transitory memory) associated with the memory 214.

As shown, the provider computing system 210 further includes the data enrichment circuit 230 communicatively coupled to the processor 212, the memory 214, and the network interface 216. In some embodiments, the data enrichment circuit 230 is structured to monitor network traffic between the network interface 116 of the source computing system 110 and/or the network interface 216 of the provider computing system 210. For example, in some arrangements, the data enrichment circuit 230 receives files, such as text files and audio files, from the network interface 216 and sends the files to the natural language processor 232. The natural language processor 232 is communicatively coupled to the data enrichment circuit 230. The natural language processor 232 is structured to interpret the file(s) and, in some embodiments, convert the file(s) into a format readable by the data enrichment circuit 230 and the processor 212. For example, the natural language processor 232 may receive an image file containing text (e.g., a picture of a document, a scan of a document, a picture of a photograph of a sign or poster, etc.). The natural language processor 232 may convert the image file into a machine-readable text form (e.g., text file) through optical character recognition (OCR), artificial intelligence, machine learning, or similar methods. In some embodiments, the natural language processor 232 receives unstructured data (e.g., emails, webpage, blog post, social media post, presentation, etc.). In some embodiments, the natural language processor 232 may receive audio files, such as from a file including only audio signals (analog and/or digital audio signals) or from a video file including audio. The natural language processor 232 may generate and provide computer-based instructions to the text file generator 220 to convert or translate the audio file into a text file. In some embodiments, the natural language processor 232 may receive structured data. In embodiments where the structured data is received but the structure is unclear or not explicitly stated in the structured data, the natural language processor 232 may determine the structure of the data, determine that the data is semi-structured, or restructure the data to be structured in a more useful or preferable structure. For example, the natural language processor 232 may receive a text file (e.g., a file having the file extension .txt) having commas that separate values and words. While it may not be explicit that the text file was intended to be a comma separated value (CSV) file, the natural language processor 232 may determine that the text file is optimally processed and interpreted as a CSV file and, accordingly, may process the received text file as a CSV file. In some embodiments, the natural language processor 232 may reformat the text file from a .txt file to a CSV file. In some embodiments, a scanned image of a table (e.g., excel table, chart, etc.) may be transmitted to the natural language processor 232. The natural language processor 232 may determine that the scanned image is better processed as a CSV or .txt file and the natural language processor 232 may convert the scanned image (e.g., .png, tif, etc.) into a CSV or .txt file, thereby generating a new file.

The provider computing system 210 further includes the early risk alert generation circuit 240 communicatively coupled to the processor 212, the memory 214, and the network interface 216. The early risk alert generation circuit 240 may receive data from the data enrichment circuit 230, send data to the network interface 216, and store data in the operational risk database 250. The early risk alert generation circuit 240 is structured to generate an alert and transmit the alert to a responsible party (i.e. to a responder computing device/system) responsive to determining that the text file is related to a risk event. In some embodiments, the early risk alert generation circuit 240 determines whether or not an alert is necessary and/or how the alert is delivered to the responder computing device/system. For example, the alert may be in the form of a push notification that shows up on a main screen of the responder computing device/system irrespective of the application currently being run by the responder computing device/system. In some embodiments, the early risk alert generation circuit 240 transmits the alert internally (e.g., to an entity within the provider computing system 210, such as a computer display or another output device coupled to the provider computing system 210).

As shown, the provider computing system 210 further includes the operational risk database 250 communicatively coupled to the early risk alert generation circuit 240. The operational risk database 250 may include both structured and unstructured data. In some embodiments, the file received from the source computing system 110 (e.g., audio file, photograph, image file, etc.) is stored within the operational risk database 250 by the network interface 216 upon receipt of the file. In some embodiments, such as if the operational risk database 250 stores only internal operational risk data, the provider computing system 210 may determine whether or not the file received from the source computing system 110 qualifies as internal operational risk data. Before the file is stored in the operational risk database 250, the provider computing system 210 may associate the file with metadata as described further herein. In some embodiments, the file is associated with metadata by the text file generator 122 before the file is transmitted to the provider computing system 210. In some embodiments, metadata is added to the file by the data enrichment circuit 230 in response to the data enrichment circuit 230 determining that the file is relevant to (e.g., indicative of) a potential risk. In some embodiments, the natural language processor 232 is structured to determine a date, sender, source computing device, source IP address, location, subject, title, or related information about the file and then add that data to the file as metadata.

The provider computing system 210 and the source computing system 110 originate and/or transmit traffic via the network 101. The term "traffic", as in "network traffic", generally refers to data communications between the provider computing system 210 and the source computing system 110. Network traffic is segmented into packets. Each packet is a formatted unit for the data and routing instructions carried via the network 101. As used herein, the term "packet" may refer to formatted units at various levels of the open systems interconnection (OSI) networking and/or TCP/IP models, such that the terms "packet", "segment", "datagram", and "frame" may be used interchangeably. An example packet comprises a header, a footer, and a payload. In some embodiments, packets may also comprise metadata, which may comprise further routing information. In some embodiments, the standard segments of the packets are included in the metadata. Any of the header, footer, and/or payload of a particular packet or group of packets can be parsed to identify metadata and/or data value(s) that may be supplemented with additional values (e.g., from enrichment data, from affinitized data, etc.) to generate metadata.

Figure 2:
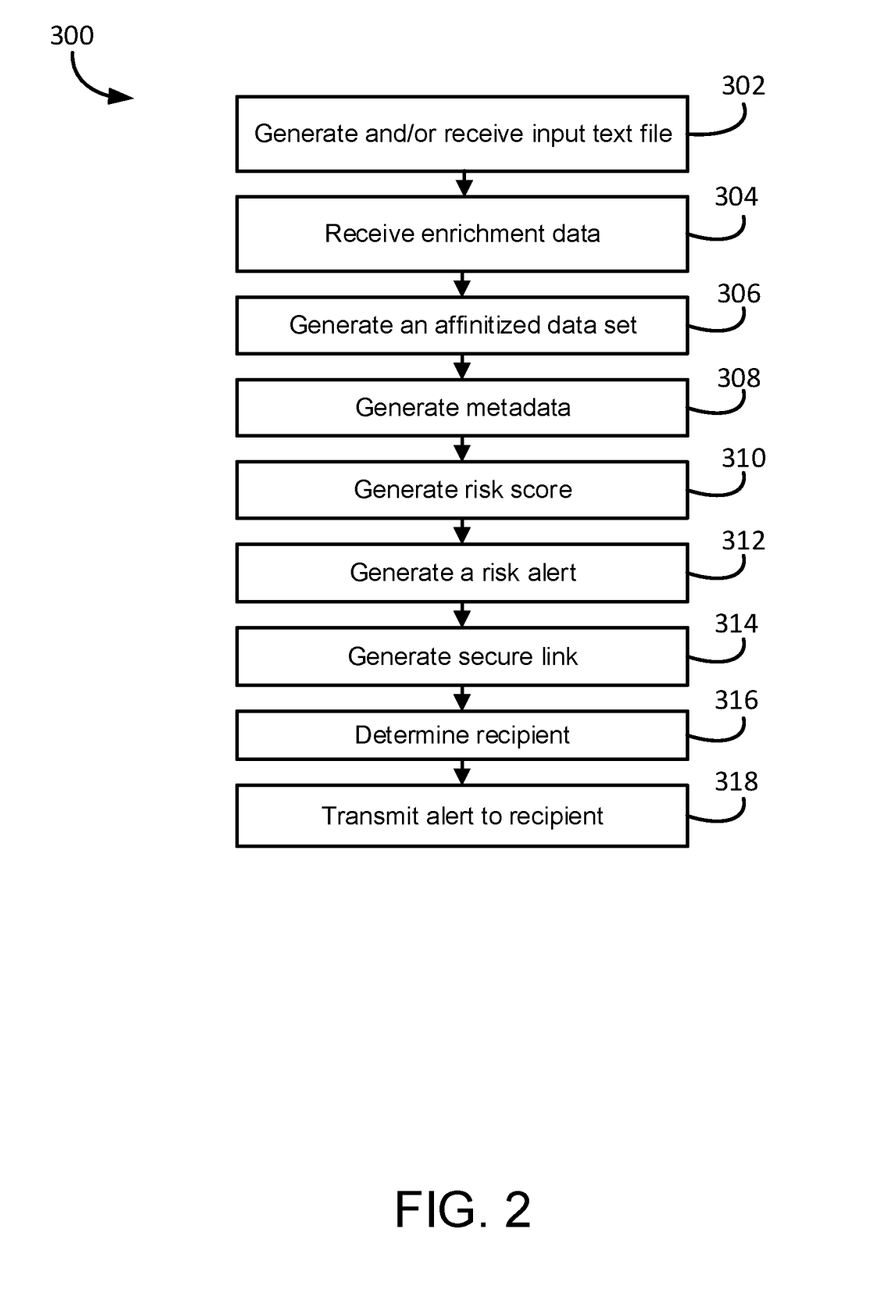
FIG. 2 is a block diagram of a method of detecting a risk event according to the example embodiment of FIG. 1.

Referring now to FIG. 2, a method 300 of enhanced risk identification is shown according to an embodiment. In an example embodiment, the method 300 may be executed by the source computing system 110 and/or the provider computing system 210. As shown, the method 300 includes operations to generate and/or receive an input text file, receive enrichment data, generate an affinitized data set, generate metadata, generate a risk score, generate a risk alert, generate a secure link, determine a recipient, and transmit the risk alert to the recipient. In some embodiments, these operations may be omitted and/or combined. For example, a text file may be generated by text file generator 122 of the source computing system 110 and/or the text file generator 220 of the provider computing system 210 as described in reference to FIG. 1.

At 302, a text file is generated and/or received by a text file generator. In some embodiments, the text file generator 122 of the source computing system 110 generates a text file and transmits the text file to the provider computing system 210. Specifically, the text file generator 122 generates a text file and the network interface 116 transmits the text file to the provider computing system 210. The text file may be generated in response to the source 100 interfacing with the input/output circuit 120. In some embodiments, the text file is generated by the text file generator 220 of the provider computing system 210. According to various embodiments, the text file may be generated based on data input from an audio file (e.g., a customer service call), a video file, etc. In some embodiments, operations to generate a text file comprise transcribing audio input into textual form. In some embodiments, the text file is unstructured data. For example the text file may be a string of characters, including letters, numbers, and symbols. Further, the text file may be either a portion of or the entirety of an email, a blog post, a social media post, a text message (e.g., MMS, SMS, etc.), a voicemail transcript, a video message transcript, and/or a call transcript.

In some embodiments, the source 100 (e.g., reporting party, alerting party, etc.) may utilize a fraud reporting interface, maintained by the provider computing system 210 and accessible via the communication portal 124, by inputting information into the fraud reporting interface via the input/output circuit 120. The text file may include various types of information, including names, locations, dollar amounts, dates, times, and other information related to a potential risk event. In some embodiments, the text file includes structured data, semi-structured data, and/or unstructured data. The text file may also include metadata that is attached to the text file by the source computing system 110 (e.g., the text file generator 122, the network interface 116, etc.) when the source 100 sends the text file to the provider computing system 210. For example, the metadata may include a date, time, device identifier, IP address, hash, identifier, location, and the like. In some embodiments, in an effort to protect the identity of the reporting party, metadata relating to the source 100 and the source computing system 110, such as location, device identifier, IP address, and name may not be attached to the text file or may be encrypted. In some embodiments, metadata, in part or in entirety, may be attached to the file by the metadata generator 231 of the provider computing system 210.

In some embodiments, the provider computing system 210 receives the text file from the source computing system 110. Specifically, the network interface 216 receives the text file from the network interface 116, the text file including the metadata. In some embodiments, the text file may be generated from within the provider computing system 210. For example, the source computing system 110 may be a computing system controlled by the provider computing system 210 and the network 101 may be a private network only accessible to computing systems authorized by the provider computing system 210, such as through a password. For example, the source computing system 110 may be operated and/or managed by the provider 200 and be connected to an intranet that is protected from access via the network 101. The text file may be posted to an online message board, sent in an instant message between employees, an internal email, and external email sent received via the network interface 216, a text document saved to a computer or machine, a call transcript, or similar text files.

In some embodiments, the provider computing system 210 receives a file that is not machine-readable text (e.g., video file, audio file, photograph, etc.). For example, the source computing system 110 may post an image of a memo containing classified information to a social media account. The network interface 216 may receive (e.g., intercept) the image and send the image to the data enrichment circuit 230 to be converted into a machine-readable file (e.g., text file). In some embodiments, the network interface 216 receives a voicemail. The network interface 216 may transmit the voicemail to the natural language processor 232 and/or the text file generator 220 to be converted into a text file. In some embodiments, the data enrichment circuit 230 may receive a video file from the network interface 216 and convert the audio from the video file into a machine-readable text file. The natural language processor 232 may further be structured to analyze the video file frame by frame, detecting print words in each frame and converting each frame into a text file.

At 304, the provider computing system 210 receives enrichment data. Specifically, the network interface 216 may receive enrichment data and store the enrichment data in the memory 214. Enrichment data may include internal loss data, external loss data, municipal data, demographic data, economic data, and similar data. In some embodiments, the enrichment data may be specific to a geographic location. For example, the enrichment data may include average home prices for a specific location, demographic information for a specific location, income information for persons living in a specific location, average time for a home to be on the market (e.g., for sale) in a geographic location, and so on. The economic data and the municipal data may also be location specific. For example, for a given city, the enrichment data may include property tax revenue, retail industry growth rate, municipal budgets, revenue from taxes, including sales tax, corporate tax, and property tax, per capita growth and income, and similar information and data.

Enrichment data may be structured according to various formats, including text files, audio files, images, scanned documents, paper files, handwritten notes, video files, news reports, documentaries, interviews, tax forms, social media data, and similar formats. In some embodiments, the enrichment data is received as unstructured data, and the natural language processor 232 may structure the data. For example, the enrichment data may be received from a scanned table of home values in a geographic area (e.g., county). The natural language processor 232 may convert the scanned image into structured data, such as a CSV file or an editable text file. In some embodiments, the enrichment data may be received in the form of a scanned document, photograph, or similar format that does not include machine-readable text. The natural language processor 232 may convert the scanned document, photograph, or similarly formatted data into a machine-readable text file using optical character recognition (OCR). The network interface 216 may receive the scanned document or photograph and send the scanned document or photograph to the natural language processor 232 to be translated and/or converted into a machine-readable language or text file.

In some embodiments, the enrichment data may be received directly from the source computing system 110 at the same time as or temporally close (e.g., within 10 minutes, an hour, 24 hours) to the time the text file is received. For example, the source 100 may access the fraud reporting interface maintained via the communication portal 124. The fraud reporting interface may allow a user to attach enrichment data, including photographs, scanned documents (e.g., contracts, brochures, etc.) and send the enrichment data to the provider computing system 210. When the provider computing system 210 receives the enrichment data from the source computing system 110, the provider computing system 210 may send the enrichment data to the natural language processor 232 and store the enrichment data to the memory 214.

Referring generally to operations 308, 310, and 312, these operations may generally occur at the same time or quickly one after another in any suitable sequence. In some embodiments, as will be explained herein, these three operations are iterative. Specifically, operations 308, 310, and 312 may be repeated in a 3-step sequence. As outlined above, an affinitized data set may be formed and modified, such as by adding enrichment data to an affinitized data set. The affinitized data set may be formed and added to as the provider computing system 210 acquires or generates text files. For example, an affinitized data set may be affinitized based on a period of time. For example, the affinitized data set may include data and text files relevant to a certain period of time (e.g., September 2020-July 2021). When a text file is received by the provider computing system 210, the data enrichment circuit 230 may determine that the text file includes information related to the period of time. The provider computing system 210 may then affinitize the text file with the affinitized data set. This order of operations may be repeated as necessary to increase the amount of data affinitized within the affinitized data set.

At 306, the provider computing system 210 generates an affinitized data set. Specifically, the data enrichment circuit 230 generates an affinitized data set that includes the text file (e.g., the text file that was translated and/or converted by the natural language processor 232) and enrichment data. The data enrichment circuit 230 may affinitize the text file and the enrichment data in response to determining that the text file and the enrichment data are related.

For example, the provider computing system 210 may affinitize a first text file and a second text file, determining that both the first text file and the second text file are related to each other. The first text file may include a context-indicative keyword, such as a location or a name, which may be flagged by the natural language processor 232. The natural language processor 232 may detect the location from the first text file based on the capitalization of letters, the placement of punctuation (e.g., capitalized words separated by commas, etc.), context (e.g., trigger words, such as "send to" or "live in" may prompt the natural language processor 232 to detect a location), a form field, and the like. The second text file, generated by the provider computing system 210, may include enrichment data that includes a location. If the location disclosed in first text file is similar or related to the location in the metadata of the second text file, the processor 202 may affinitize the first text file and the second text file.

Accordingly, the enrichment data may also be affinitized with the first text file and the second text file. For example, the affinitized data may include municipality information related to the locations associated with the first text file and the second text file. The first text file and the second text file may be generated in two separate locations, but both the first text file and the second text file may include information about a possible instance of fraud occurring in Hartford, Connecticut. The municipality information may be related to current housing prices, historic interest rates, and similar information within Hartford, Connecticut. The municipality data may then be affinitized with both the first text file and the second text file.

At 308, the metadata generator 231 of the provider computing system 210 may receive and/or generate metadata and associate the metadata with the affinitized data set. Specifically, the metadata generator 231 may associate metadata with the text file based on the content of the text file or based on the receipt of the text file. For example, the metadata generator 231 may associate a time stamp with the text file when the text file is received by the network interface 216. The time stamp may be parsed from the header, footer, or payload of the corresponding network packet. As such, in some embodiments, the text file may be transmitted to the provider computing system 210 already associated with metadata. For example, the source computing system 110 may associate with the first text file with metadata, such as a device identifier, an IP address, geographic location, or similar metadata before transmitting the first text file to the provider computing system 210. In some embodiments, the metadata generator 231 may associate the text file with further metadata derived from information in the transcribed text file, such as a name, location, date, time, or similar information. For example, an incoming audio file may be transcribed and segments from the transcript identified and stored as metadata. In this manner, a subset of information extracted from the text file is also stored and/or designated as a particular metadata item. Advantageously, this additional metadata, which is not discernible from the original audio recording, is now capable of being identified and added to the corresponding text data file. Further, in some embodiments, the natural language processor 232 is structured to detect key words from the transcribed text file. For example, if the word "fraud" appears in the text file, the natural language processor 232 may trigger the metadata generator 231 to associate the text file with keywords relating to "fraud," or the metadata generator 231 may associate the text file with the key word so that the text file can be included in an affinitized data set in the future with other text files that include the keyword "fraud." Accordingly, the metadata may be updated to include a key word (e.g., a risk descriptor) or a plurality of keywords. These keyword(s) may be retrievably stored in the operational risk database 250 and may be relationally linked to one or more responsible parties and/or attributes associated with responsible parties (responder device/computing system identifier, responder network address, such as IP address, secure file upload location, etc.). The information regarding keywords may be cross-referenced to determine a list of responsible parties, as described further herein. In some embodiments, metadata (e.g., the key word(s) and or various combinations of key word(s), source device identifier(s), locations, IP addresses, etc.) can also be used to assign a risk score to the alert. In some embodiments, such as if the operational risk database 250 stores only internal operational risk data, the metadata generator 231 may make a determination as to whether or not the text file should be stored in the operational risk database 250. For example, the metadata generator 231 may associate a text file, such as a newspaper article or online review, as "external" and determine that the text file does not belong in the internal operational risk database.

At 310, the provider computing system 210, and more specifically the data enrichment circuit 230, may generate a risk score. The risk score may indicate how likely it is that the text file is related to a risk event (e.g., operational risk event, internal operational risk event) or a potential risk event (e.g., potential operational risk event, potential internal operational risk event). A risk event (or operational risk event) may include events that are internal to or external to the provider computing system 210, such as a natural disaster or the passing of legislation. An internal operational risk event includes only events that are internal to the provider 200, such as the corruption of internal files, an employee committing fraud, or inefficient business practices. The risk score may be determined based on a context-indicative keyword detected in the text file by the natural language processor 232, based on the metadata, which may comprise the context-indicative keywords and/or risk descriptors as described above, and/or based on a combination thereof. The risk score may be determined based on a quantity of context-indicative keywords within the input text file. For example, if the word "sell" appears multiple times in the text file, the risk score may be biased toward a riskier score when compared to a text file that only includes one instance of "sell." This may be represented on any suitable scale comprising discrete values, such as a scale of integers between 0 and 10, 0 and 100, etc. In some embodiments, the natural language processor 232 is structured to complete a sentiment analysis or determine a sentiment score for the input text file, the sentiment score combined with the context-indicative keyword to generate a risk score. In some embodiments, certain context-indicative keywords are assigned a threshold risk score, such that an input text file including the context-indicative keyword is automatically assigned a risk score above the threshold score. For example, the word "fraud" included in the input text file may be assigned a risk score such that a certain risk score is guaranteed, regardless of the foregoing analysis of the input text file of the context of the input text file.

In an example illustrative of aspects of computer-based operations according to FIG. 2, the provider computing system 210 may receive an input data item, such as an audio recording of a complaint call. The provider computing system 210 may generate a first text file based on the audio recording. The provider computing system 210 may determine that the first text file includes a sale price for a recently sold home (e.g., property) and a geographic location of the recently sold home. The first text file may be supplemented with various enrichment data, such as data parsed by the provider computing system 210 from an official form (e.g., deed, contract, etc.), news outlet publication (e.g., pamphlet, newspaper), or a blog post (e.g., "Just sold my vacation home for well above market price!"). For example, the sale price may be $600,000 and the location may be Boulder, Colorado. The provider computing system 210 may also have access to enrichment data related to the geographic location (e.g., Boulder, Colorado), such as median home price ($800,000), a standard deviation of home prices ($100,000), and an average length of time a for-sale home remains on the market (e.g., time between when the property is listed as 'for sale' to when the listing is removed). In the aforementioned example, the provider computing system 210 would generate an affinitized data set that includes all of the above information (first text file and enrichment data). In some embodiments, the provider computing system 210 may assign a risk score to the affinitized data, the risk score indicating the likelihood that the first text file is indicative of fraudulent activity. In the aforementioned example, the sale price is two standard deviations below the median, which could indicate that the sale price is unusually low and indicative of a fraudulent transaction.

It should be understood that sale price is just one aspect of a transaction that the data enrichment circuit 230 may look at, and that the data enrichment circuit 230 may take into consideration a vast array of information from different sources. For example, the enrichment data may include market trends, indicating that home prices are down in Boulder, Colorado due to the closing of the local college. Or the enrichment data may include an obituary for the previous owner, possibly indicating that a quick sale of the home was prioritized over receiving a fair price.

Adding the example above, a second text file may be received and/or generated by the provider computing system 210, indicating that the recently sold home was sold again just 30 days later for a price of $850,000. The provider computing system 210 may form a connection between the 30 day sale and the enrichment data, which includes information about how quickly properties sell in Boulder, Colorado. For example, the average length of time on the market for a home in Boulder, Colorado may be 75 days, and the national average length of time on the market for a home with a value between $800,000 and $1,000,000 may be 120 days. The provider computing system 210 may create an affinitized data set that includes all of the information about the length of time the home sold and the enrichment data, which includes statistics and other information about how quickly homes sell and for how much. For the property in the aforementioned example, the provider computing system 210 may assign the transaction a particular risk score, such as "medium risk" or a value of 5 on a scale from 0 to 10.

Each of the first text file and the second text file, on their own, may indicate a medium risk. However, in combination, the first text file and the second text file may be indicative of fraud. After receiving the first text file, the provider computing system 210 may associate the first text file with metadata (e.g., the transaction location parsed by the metadata generator 231 from the content of the first text file, the source computing system device identifier, etc.), create a first affinitized data set including the first text file and the related municipality data outlined above (e.g., home address), and store the first affinitized data set in the operational risk database 250. When the second text file is received, the data enrichment circuit 230 may determine the address associated with the second text file, and then conduct a search in the operational risk database 250 for the address. During the search, the first affinitized data set may be retrieved, and the data enrichment circuit 230 may create a second affinitized data, including the first affinitized data set, the second text file associated with metadata, and related enrichment data.

Referring again to the example above, the first sale of the home may be indicated by information determined based on the affinitized first text file, and the subsequent sale of the home may be indicated by the affinitized second text file. The data enrichment circuit 230 may form another affinitized data set including the first text file, the second text file, the enrichment data associated with each of the first text file and the second text file, and the metadata associated with the first text file and the second text file. By forming an affinitized data set including multiple text files, the data enrichment circuit 230 may improve the accuracy and reliability of the risk analysis and the risk score. The text files may compound upon one another. In the above example, the home was sold below market price (medium risk), and then was sold again quicker than expected (medium risk). Independently, these events may not warrant investigation. But combined, these two text files may indicate a fraudulent transaction. Specifically, a broker may be manipulating their clients to sell their homes below market price to a buyer who is working with the broker, and then selling the home for a higher price closer to market value. The data enrichment circuit 230 may create an affinitized data set including the text files and the enrichment data.

At 312, the provider computing system 210, and more specifically, the early risk alert generation circuit 240, may generate a risk alert. The risk alert may be associated with a responsible party determined based at least on the metadata. The risk alert may be further associated with a risk score determined based on the enriched data.

In some embodiments, the risk alert may include the affinitized data set. The early risk alert generation circuit 240 may cooperate with the data enrichment circuit 230 to generate the risk alert. The risk alert may be a push notification sent to the source computing system 110 and structured to cause the source computing system 110 to vibrate, chime, buzz, or complete a similar notification action. In some embodiments, the risk alert is transmitted via the communication portal 124. For example, the responsible party receiving the risk alert may be a user (e.g., customer, contractor, employee, etc.) of the provider computing system 210, and the source computing system 110 may be communicatively coupled to the provider computing system 210 via a secured network (e.g., network 101). The user may log into the communication portal 124 and see a list (e.g., display, grid, graph, email, etc.) of risk alerts. In some embodiments, it is the user's job to sort through the risk alerts and determine whether or not the risk alert needs further attention. In some embodiments, each risk alert in the list of risk alerts is associated with an affinitized data set. In some embodiments, the risk alert is associated with a plurality of affinitized data sets. In other words, an affinitized data set may be associated with multiple risk alerts. For example, the affinitized data may include information relating to a particularly dishonest mortgage broker in Columbia, Missouri, and multiple sources 100 may have utilized the fraud reporting interface to report the broker. Each of the reports submitted to the fraud reporting interface may result in a separate risk alert being sent to the communication portal 124, and the affinitized data may be associated with each risk alert.

At 314, the provider computing system 210, and more specifically the processor 212, may generate a secure link. The secure link may be associated with the affinitized data set and the risk alert. The secure link may be included in the risk alert when the risk alert is sent to the responsible party. In some embodiments, the secure link is a hyperlink that opens a web page on the source computing system 110 and allows the responsible party to upload or attach files. The files may then be transmitted to the natural language processor 232 to be interpreted and/or converted into a machine readable language.

At 316, the provider computing system 210, and specifically the data enrichment circuit 230, determines a responsible party of the risk alert and the secure link. In some embodiments, the context-indicative keyword is linked to a first responsible party and the risk score is linked to a second responsible party. For example, the context-indicative keyword may be related to a location, and the first responsible party may be related to the location that is related to the context-indicative keyword. The second responsible party may be a high-level user or supervisor that is associated with a second responsibility score. In some embodiments, the first responsible party and the second responsible party are the same. The responsible party may be a department head, employee, supervisor, or reporting party. In some embodiments, the responsible party may be the provider of the text file. For example, a reporting party may utilize the fraud reporting interface and provide their contact information. If the data enrichment circuit 230 determines that more information is necessary to develop an accurate risk score, the early risk alert generation circuit 240 may send an alert and a secure link to the reporting party. The secure link, when clicked, may be a hyperlink that opens a webpage where the reporting party may upload more text files to support an investigation.

At 318, the provider computing system 210, specifically the network interface 216, transmits the risk alert to the responsible party. In some embodiments, the provider computing system 210 transmits the risk alert to the first responsible party and the second responsible party. The network interface 216 may transmit the risk alert to the communication portal 124 to be accessed at a later time by the source 100. As outlined above, the communication portal 124 may be password protected and only accessible to a user with the proper credentials. When the user is granted access to the communication portal 124 in response to entering the appropriate credentials, the user may view, edit, analyze, and asses various risk alerts within the communication portal 124.

Figure 3:
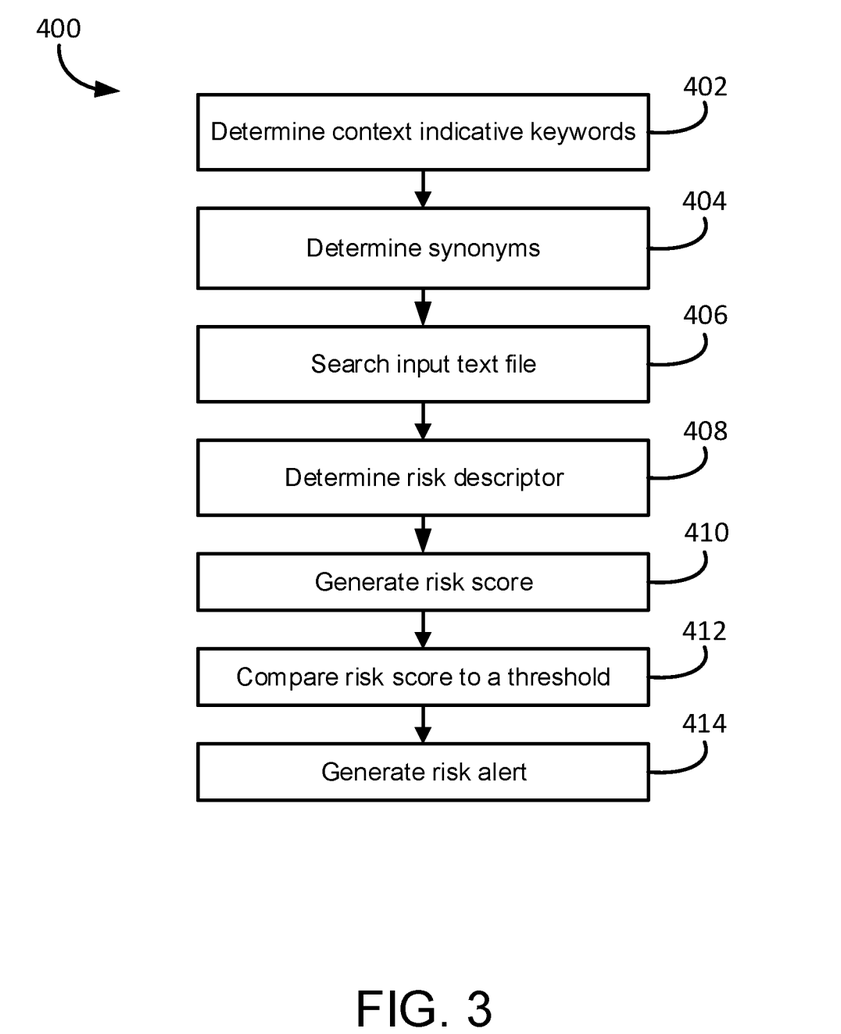
FIG. 3 is a block diagram of a method of affinitizing the electronic text received from the source computing system of the example embodiment of FIG. 1.

Turning now to FIG. 3, a method 400 of enhanced risk identification is shown according to an embodiment. In an example embodiment, the method 400 may be executed by the source computing system 110 and/or the provider computing system 210. As shown, the method 400 includes operations to determine context indicative keywords, determine synonyms of the context indicative keywords, search an input text file, determine a risk descriptor, generate a risk score, compare the risk score to a threshold, and generate a risk alert.

At 402, context indicative keywords are determined. The context indicative keywords may be determined by the data enrichment circuit 230 as part of the process of enriching textual data and/or generating metadata for the textual data (e.g., in situations where metadata is generated based on the content of a particular text file). In some embodiments, the natural language processor 232 may determine the context indicative keywords through machine learning and/or artificial intelligence, such as natural language processing, natural language understanding (e.g., human-to-machine translation), named entity recognition, tokenization (e.g., segmentation of a text stream into a collection of tokens, such as word combinations, words, characters, digits/numbers, punctuation, etc.), stemming (e.g., determining the root form of a particular term), etc. For example, the natural language processor 232 may tokenize input text from the text file into tokens comprising individual words or phrases. The natural language processor 232 may determine that certain words or phrases are indicative of a risk event. Further, the natural language processor 232 may use additional factors, such as the relative location of tokens in the text file, to determine that certain words or phrases are not indicative of a risk event or a potential risk event. For example, the words "fraud," "confidential," or "error" may appear regularly within boilerplate language at the bottom of emails sent between the provider computing system 210 and the source computing system 110. The natural language processor 232 may make this determination by using, for example, sentence or document boundary detection, sentence boundary disambiguation, and/or sentence boundary recognition techniques embodied in computer code. For example, the natural language processor 232 may determine that the keywords/tokens appear in the last sentence, the last paragraph, etc. of a particular document, such as an email message. Accordingly, while at first the natural language processor 232 may indicate to the data enrichment circuit 230 that these messages may be indicative of a risk event or a potential risk event, the data enrichment circuit 230 may eventually learn and/or determine that such words, based upon context, are not indicative of a risk event.

Example tokens that include context indicative keywords may be provided by a user, employee, and/or responsible party directly to the memory 214 or the operational risk database 250. In some embodiments, the data enrichment circuit 230 may be "trained" to detect certain context indicative keywords before being implemented within the provider computing system 210.

At 404, synonyms of the context indicative keywords are determined. The synonyms may be determined by the natural language processor 232 and transmitted to the data enrichment circuit 230. For example, the data enrichment circuit 230 may be operably coupled to a database (e.g., the internet and/or the operational risk database 250 that includes a thesaurus). The thesaurus may include mapped token collections, each collection linking tokens that are similar in meaning. Further, the synonyms may be determined based on the context in which the data enrichment circuit 230 operates or is utilized. Accordingly, each token collection may further include a contextual descriptor. For example, the word "inflate" would have different synonyms based on the industry in which the provider computing system 210 operates. In a banking and mortgage environment, a synonym for "inflate" might be "overestimate," while colloquially, "inflate" may be associated with different synonyms. Further, the mapped token collections may also include common misspellings of words. For example, synonyms of the word "paid" may include "payed" and "payd".

At 406, natural language processor 232 searches the text file for the context indicative keywords and the associated synonyms. As outlined above, the natural language processor 232 is structured to interpret and decipher non-text files, unstructured data, and inputs to the fraud detection interface. The natural language processor 232 may detect, in real time, the text input into the fraud detection interface such that the input of a context indicative keyword or a synonym may trigger an alert, capturing information about the source computing system 110 that is accessing the fraud reporting interface.

At 408, the data enrichment circuit 230 determines a risk descriptor based on the keywords detected by the natural language processor 232 from the input text file. In some embodiments, the data enrichment circuit 230 determines the risk descriptor from the metadata associated with the input text file by the author of the input text file or associated with the input text file by the metadata generator 231. In some embodiments, the risk descriptor is relationally associated to one or more particular mapped token collections in the operational risk database 250, such that the risk descriptor is determined based on the one or more context-indicative keywords. The risk descriptor may further include a risk quantifier, the risk quantifier determined by the data enrichment circuit 230. The risk descriptor may inlcude one or two words that quickly allows the responsible party to understand the nature of the potential risk activity prior to opening the risk alert and the enrichment data. For example, the risk descriptor could be "inflated appraisal," quickly indicating to the responsible party what the potential risk activity is.

At 410, the data enrichment circuit 230 determines a risk score (e.g., risk quantifier). The risk score may be a ranking of confidence for how likely it is that the input text file is indicative of a risk event or a potential risk event on a suitable scale, such as 0-10, 0-100, etc. The risk score may be percentage-based ranking (between and inclusive of 1% and 100%) of how likely it is that the affinitized data set (e.g., text file) is indicative of a risk event or a potential risk event. For example, the provider computing system 210 may monitor all messages posted to an internal company message board. A message that read "who wants my tickets to tomorrow's Redwings Game?" may be assigned a risk score of 3%, indicating that there is a 3% chance that the affinitized data set is indicative of a risk event. As another example, a post to the message board may read "We have an unclaimed check in the amount of $98,734. Please let us know if you were expecting this check." Such a message may, without consideration of the associated metadata, be assigned a risk score of 68%, indicating that this message may more likely than not be indicative of a potential risk event. In such an example, context indicative keywords may include the "$" symbol, "check," "unclaimed," and "amount." Referring still to the aforementioned example, the message may be associated with metadata, such as a sender and a date of being sent. For example, the message may have been sent by Jane Doe, who recently had been warned about failing to properly fill in documentation before allocating assets. Thus, knowing who sent the message may increase the risk score.

At 412, the data enrichment circuit 230 may compare the risk score to a predetermined threshold and determine if the risk score is above or below the threshold. If the risk score is above the threshold, the data enrichment circuit 230 determines that the input text file should be reported (e.g., transmitted, sent, etc.) to the responsible party. In the risk score is below the threshold, the data enrichment circuit 230 may associate the input text file with metadata, affinitize the input text file with enrichment data, and store the affinitized data set in the operational risk database 250 for recall later.

At 414, the early risk alert generation circuit 240 generates the risk alert. The risk alert may include the affinitized data, the risk descriptor, and the risk score.

Figure 4:
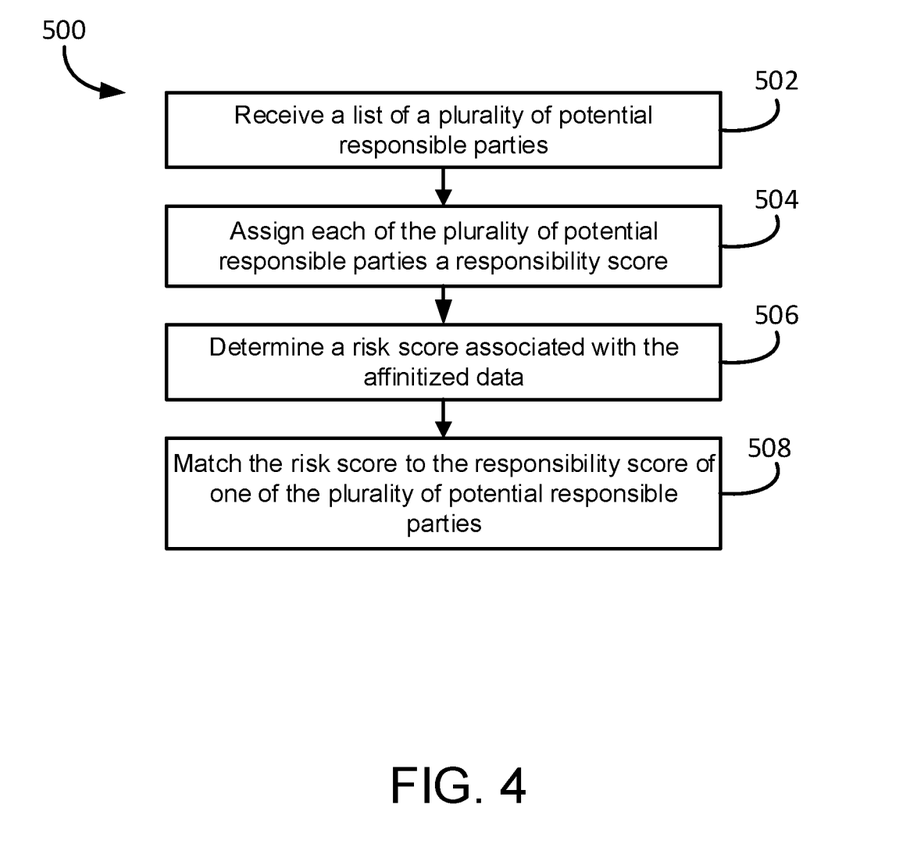
FIG. 4 is a block diagram of a method of determining a responsible party, according to an example embodiment.

Referring now to FIG. 4, a method 500 of enhanced risk identification is shown according to an embodiment. In an example embodiment, the method 500 may be executed by the source computing system 110 and/or the provider computing system 210. As shown, the method 500 includes operations to receive a list of a plurality of potential responsible parties, assign each of the plurality of potential responsible parties a responsibility score, determine a risk score associated with the affinitized data, and match the risk score to the responsibility score of one of the plurality of potential responsible parties. The responsible party may be determined based on the risk score, the input text file, the context indicative keywords, the risk descriptor, and/or the metadata associated with the input text file. The responsible party and the associated information (e.g., responder computing system/device information, active directory group membership, email address, secure file location for uploading data associated with the alerts, authentication information (PIN, password, tokenized biometric information, etc. for allowing the responder to access the alert content, etc.)) may be stored in the operational risk database 250 relationally to any of the mapped token collections, risk descriptors, risk quantifiers, individual tokens (context-indicative keywords) or any combination of the above. In some embodiments, the responsible party is an individual. In some embodiments, the responsible party is a particular computing device. In some embodiments, the responsible party is a group, such as an active directory group. Accordingly, early risk alerts may be broadcast to particular individuals (e.g., based on device identifiers, email addresses, etc.), devices (e.g., based on a MAC address, IP address, secure file location uniquely associated with a particular device, etc.), and/or groups (e.g., by transmitting the alert to members of a particular active directory group identified as the responsible party).

At 502, the operational risk database 250 may receive data regarding a plurality of potential responsible parties (for example, in the form of a list, a data set, etc.). Each responsible party from the list of the plurality of potential responsible parties may be assigned a responsibility score that is correlated with the risk score. For example, similar to the risk score, the responsibility score may be scaled by percentages, though it should be appreciated that there are many ranking scales available (e.g., letter grades, numbers, colors, etc.). For example, responsible party A may be assigned a responsibility score of 4, while responsible party B is assigned a responsibility score of 9. In response to the data enrichment circuit 230 determining that the input text file is indicative of a potential risk event, the data enrichment circuit 230 may associate the input text file with metadata, create an affinitized data set including enrichment data, assign the affinitized data set a risk quantifier of 45%, as a non-limiting example, and transmit the affinitized data set to the early risk alert generation circuit 240. The early risk alert generation circuit 240 may retrieve the list of the plurality of potential responsible parties from the operational risk database 250, and determine which responsible party to transmit the risk alert to. In this example, the risk score of 45% may be indicative of a relatively low risk potential risk event, and thus the early risk alert generation circuit 240 would transmit the risk alert to responsible party A.

At 504, the data enrichment circuit 230 may assign each of the responsible parties in the list of the plurality of responsible parties a responsibility score. The responsibility score may be based on a variety of factors, including information specific to each of the plurality of responsible parties, such as location, status, job title, years employed, salary, active directory group membership, and so on. In some embodiments, the responsible score is determined each time the early risk alert generation circuit 240 makes a determination of who to send the risk alert to. For example, the input text file may have been sent by user A and assigned a risk quantifier of 89%. Depending upon the context indicative keywords associated with the input text file, it may be determined by the early risk alert generation circuit 240 that the risk alert should be sent to the responsible party who works in the same location as user A. In another example, it may be determined that sending the risk alert to a similar location as user A may lead to a conflict of interest, such as if the data enrichment circuit 230 determines that the responsible party may be involved in the potential risk event. Thus, the early risk alert generation circuit 240 may send the risk alert to a responsible party in another location different from the location at which either the input text file was originated or in which user A works.

At 506, the data enrichment circuit 230 determines the risk score associated with the affinitized data as described, for example, with respect to FIG. 3.

At 508, the early risk alert generation circuit 240 determines the responsible party to transmit the risk alert to. As outlined above, the responsible score of each of the plurality of responsible parties may change based upon the contextual keywords and the metadata associated with the input text file. In some embodiments, even similar input text files from the same user may be sent to different responsible parties as the data enrichment circuit 230 learns through machine learning and artificial intelligence.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" (e.g., "engine") may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing system comprising:
a processing circuit comprising a processor and memory, the memory structured to store instructions that are executable by the processor and cause the processing circuit to:
tokenize input text, using at least one of first machine learning or first artificial intelligence, from an input text file into a token comprising a word or a phrase;
based on a location of the token in the input text file, determine, using at least one of second machine learning or second artificial intelligence, that the token is indicative of a potential risk event;
generate an early risk alert, the early risk alert indicative of the potential risk event;
assign a responsibility score to each of a plurality of responsible parties;
determine whether a responsible party of the plurality of responsible parties is involved in the potential risk event; and
in response to matching the potential risk event to the responsibility score of the responsible party and determining that the responsible party is not involved in the potential risk event, transmit the early risk alert to the responsible party, the early risk alert comprising a secure link to a webpage configured to receive data files uploaded by the responsible party, wherein the data files are associated with the potential risk event.

2. The system of claim 1, wherein determining the word or the phrase of the token is indicative of the potential risk event comprises using at least one of a sentence boundary detection technique, a document boundary detection technique, a sentence boundary disambiguation technique, or a sentence boundary recognition technique.

3. The system of claim 1, wherein the word or the phrase of the token that is indicative of the potential risk event is a word other than a last word in the input text file or a phrase other than a last phrase in the input text file.

4. The system of claim 1, wherein the instructions further cause the processing circuit to determine the responsible party based on risk enrichment data.

5. The system of claim 4, wherein
the risk enrichment data comprises at least one of an image file, an email, a webpage, a blog post, a social media post, a presentation, an audio file, or a video file; and
the instructions further cause the processing circuit to use natural language processing to convert the risk enrichment data to machine-readable text form.

6. The system of claim 4, wherein the instructions further cause the processing circuit to:
based on the risk enrichment data, determine a plurality of context-indicative keywords;
for each of the plurality of context-indicative keywords, determine a plurality of synonyms; and
search the input text file for at least one of the plurality of context-indicative keywords or a related synonym from the plurality of synonyms.

7. The system of claim 1, wherein the instructions further cause the processing circuit to determine the location of the token in the input text file, the location comprises one of a sentence or a paragraph.

8. A method comprising:
tokenizing input text, using at least one of first machine learning or first artificial intelligence, from an input text file into a token comprising a word or a phrase;
based on a location of the token in the input text file, determining, using at least one of second machine learning or second artificial intelligence, that the token is indicative of a potential risk event;
generating an early risk alert, the early risk alert indicative of the potential risk event;
assigning a responsibility score to each of a plurality of responsible parties;
determining whether a responsible party of the plurality of responsible parties is involved in the potential risk event; and
in response to matching the potential risk event to the responsibility score of the responsible party and determining that the responsible party is not involved in the potential risk event, transmitting the early risk alert to a responsible party, the early risk alert comprising a secure link to a webpage configured to receive data files uploaded by the responsible party, wherein the data files are associated with the potential risk event.

9. The method of claim 8, wherein determining the word or the phrase of the token is indicative of the potential risk event comprises using at least one of a sentence boundary detection technique, a document boundary detection technique, a sentence boundary disambiguation technique, or a sentence boundary recognition technique.

10. The method of claim 8, wherein the word or the phrase of the token that is indicative of the potential risk event is a word other than a last word in the input text file or a phrase other than a last phrase in the input text file.

11. The method of claim 8, comprising determining the responsible party based on risk enrichment data.

12. The method of claim 11, wherein
the risk enrichment data comprises at least one of an image file, an email, a webpage, a blog post, a social media post, a presentation, an audio file, or a video file; and
using natural language processing to convert the risk enrichment data to machine-readable text form.

13. The method of claim 11, further comprising:
based on the risk enrichment data, determining a plurality of context-indicative keywords;
for each of the plurality of context-indicative keywords, determining a plurality of synonyms; and
searching the input text file for at least one of the plurality of context-indicative keywords or a related synonym from the plurality of synonyms.

14. The method of claim 8, further comprising determining the location of the token in the input text file, the location comprises one of a sentence or a paragraph.

15. A non-transitory computer-readable medium comprising computer readable instructions, such that when executed by a processor, causes the processor to:
tokenize input text, using at least one of first machine learning or first artificial intelligence, from an input text file into a token comprising a word or a phrase;
based on a location of the token in the input text file, determine, using at least one of second machine learning or second artificial intelligence, that the token is indicative of a potential risk event;
generate an early risk alert, the early risk alert indicative of the potential risk event;
assign a responsibility score to each of a plurality of responsible parties;
determine whether a responsible party of the plurality of responsible parties is involved in the potential risk event; and
in response to matching the potential risk event to the responsibility score of the responsible party and determining that the responsible party is not involved in the potential risk event, transmit the early risk alert to a responsible party, the early risk alert comprising a secure link to a webpage configured to receive data files uploaded by the responsible party, wherein the data files are associated with the potential risk event.

16. The non-transitory computer-readable medium of claim 15, wherein determining the word or the phrase of the token is indicative of the potential risk event comprises using at least one of a sentence boundary detection technique, a document boundary detection technique, a sentence boundary disambiguation technique, or a sentence boundary recognition technique.

17. The non-transitory computer-readable medium of claim 15, wherein the word or the phrase of the token that is indicative of the potential risk event is a word other than a last word in the input text file or a phrase other than a last phrase in the input text file.

18. The non-transitory computer-readable medium of claim 15, wherein the instructions further cause the processor to determine the responsible party based on risk enrichment data.

19. The non-transitory computer-readable medium of claim 18, wherein
the risk enrichment data comprises at least one of an image file, an email, a webpage, a blog post, a social media post, a presentation, an audio file, or a video file; and
the instructions further cause the processor to use natural language processing to convert the risk enrichment data to machine-readable text form.

20. The non-transitory computer-readable medium of claim 18, wherein the processor is further caused to:
based on the risk enrichment data, determine a plurality of context-indicative keywords;
for each of the plurality of context-indicative keywords, determine a plurality of synonyms; and
search the input text file for at least one of the plurality of context-indicative keywords or a related synonym from the plurality of synonyms.

\* \* \* \* \*